Figure 1:
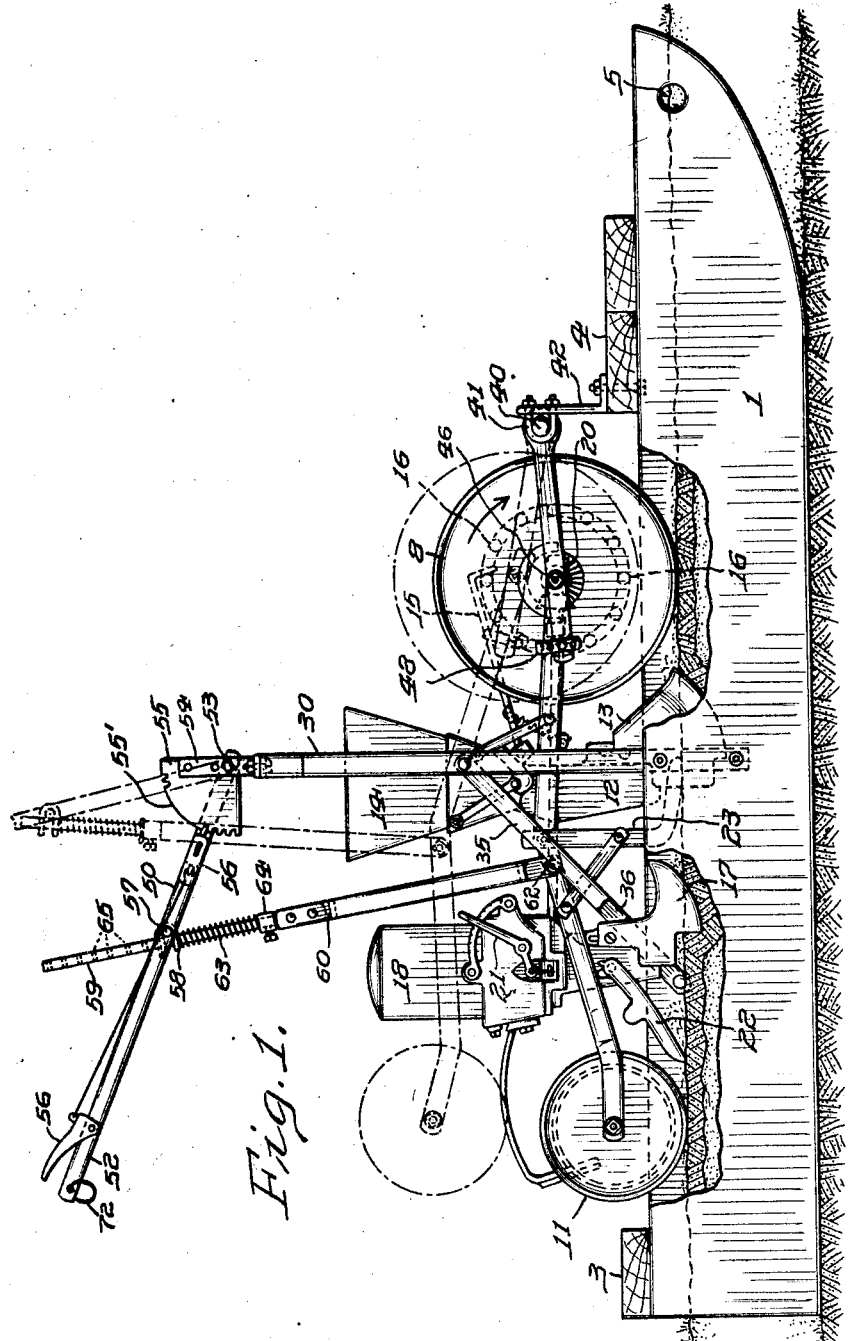

Dec. 25, 1928.

C. J. ALLEN 1,696,562

SEEDING IMPLEMENT

Filed Nov. 4, 1926

2 Sheets-Sheet 2

WITNESS

F. J. Hartman,

INVENTOR
Charles J. Allen,
BY
ATTORNEYS

Patented Dec. 25, 1928.

1,696,562

UNITED STATES PATENT OFFICE.

CHARLES J. ALLEN, OF MOORESTOWN, NEW JERSEY, ASSIGNOR TO S. L. ALLEN & CO., INC., A CORPORATION OF PENNSYLVANIA.

SEEDING IMPLEMENT.

Application filed November 4, 1926. Serial No. 146,127.

In some localities it is customary to plant certain sorts of seeds in a plurality of parallel spaced rows in the top of a longitudinally extending hill on each side of which are relatively deep valleys or depressions which separate the adjacent hills from each other; these valleys are frequently used for the distribution of irrigating water after the seeding has been accomplished. It has also been customary to enable the seeds to be conveniently sown in the manner aforesaid to mount a suitable number of seed distributing devices side by side upon a sled or drag, the runners of which are properly spaced to rest in the valleys on each side of the hill so that as the sled is dragged along the seeding devices will distribute the seed in parallel rows in the top of the hill. Considerable difficulty has been encountered, however, in the practical operation of implements of this general character and it is therefore an object of the present invention to remedy such defects and disadvantages by providing an implement so constructed and arranged as to be satisfactorily operative for the performance of its intended function.

Other objects of the invention are to provide an implement of the general character of that to which reference has just been made embodying means whereby the depth to which the seed is sown by the several seeders may be regulated to a nicety and also having readily operable means for lifting the seeders from the ground to facilitate movement of the implement to the point at which it is to be used and also when turning corners at the ends of the rows or the like.

Further objects of the invention are to provide means for the convenient attachment of the seeders to the sled to thereby form the complete operative implement which shall be readily adjustable to different widths of sleds; to provide means for keeping the seeders in properly spaced alignment under operative conditions and to provide other improvements hereinafter more fully pointed out.

The invention still further includes other objects, advantages and novel features of design, construction and arrangement to which reference is hereinafter more particularly made or which will be apparent from the accompanying drawings in which I have shown one embodiment of the invention employing two seeders and thus capable of simultaneously sowing two parallel rows of seeds in the surface of the hill, Fig. 1 in said drawing being a side elevation of the implement with portions of the sled or drag broken away to more fully disclose the construction and arrangement of certain of the parts; Fig. 2 a top plan view of the implement shown in Fig. 1, the ends of the sled runners being broken away, and Fig. 3 a rear view of the implement in operative position adjacent a hill. The same symbols are used to designate the same parts in the several figures.

Figure 3:
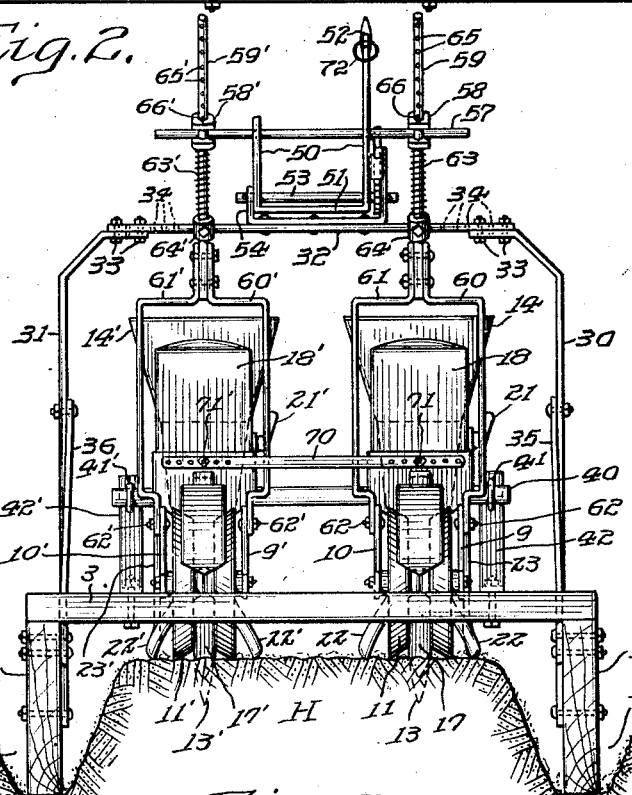

The particular embodiment of the invention which I have chosen to illustrate comprises a sled or drag having runners 1, 2 secured together by transverse braces 3, 4 extending between them and rigidly secured to their upper edges. The forward ends of the runners may be provided with holes 5 for the attachment of a bridle for connecting the implement to the source of power such as a tractor or horse by which it is drawn, while the sled is often provided with devices (not shown) for assisting in forming up the sides and leveling off the tops of the hills so as to place the latter in proper shape for the sowing of the seed. As shown in Fig. 3 the sled runners are disposed a suitable distance apart to rest in the valleys V—V at either side of the hill H and are preferably of sufficient height so that under these conditions the transverse braces 3, 4 will clear the upper surface of the hill after it is finally formed up.

As each of the seeders employed is ordinarily capable of sowing but a single row of seed, it will be apparent that the number of rows which are sown in each hill during one passage of the implement therealong will correspond with the number of seeders operatively employed, and it will be thus understood that while in the said drawings I have chosen to illustrate an implement having but two seeders and therefore intended to sow but two rows of seed in each hill, any desired number of seeders may be utilized as desired, the distance between the sled runners of course being ordinarily increased in correspondence with the number of seeders and the width of the hill to be straddled by them and, further, that under certain conditions it may be found desirable to utilize seeders each of which is capable of sowing more than a single row of seed at one time; the use of such devices is therefore comprehended by my invention since the particular type of seeders utilized is a matter of choice and their specific form and construction form no part of the present invention.

I shall therefore but briefly refer to the particular seeders which I have chosen to illustrate in a somewhat conventional manner and which, in the present instance, are designed to open a furrow in the surface of the ground to deposit therein a measured quantity of fertilizer, then cover or partially cover the furrow, then open another furrow in alignment therewith but to a somewhat lesser depth, deposit the seed in this last furrow and then cover the same, these several operations being performed consecutively as the seeding device is moved forward over the ground. As the two seeders with which the machine is equipped are identical, a description of both would be unnecessary; I shall therefore briefly refer to the principal parts of the seeder located on the right hand side of the machine and in the drawings for convenience have designated corresponding parts of the seeder on the left hand side and to which said description is equally applicable with like numerals but with the addition of a prime ('). Thus, as shown, each seeder comprises a ground wheel 8 from the axle of which extend rearwardly directed frame members 9 and 10 respectively terminating adjacent the axle of the covering wheel 11 at the rear end of the seeder. Suitably supported between the frame members in the rear of the ground wheel is a hollow casting 12 which serves to support the fertilizer furrow plow 13 and above which is positioned the fertilizer hopper 14. For feeding the fertilizer through the casting 12 to the furrow behind the plow in measured quantities suitable feeding mechanism is provided which is intermittently actuated by a finger 15 cooperative with pins 16 carried by the ground wheel. In the rear of the casting 12 a somewhat similar casting 16 is positioned between the frame members which is operative to support the seed furrow plow 17 above which is positioned the seeding hopper 18 from which the seed is fed into the casting 16 in predetermined quantities through the medium of seed feeding mechanism (not shown) disposed in the bottom of the hopper and actuated from a shaft 19 driven by bevel gearing 20 in turn actuated from the ground wheel; a regulating device operable through a handle 21 adjustably determines the rate at which the seed is fed. The casting 16 may be utilized to support covering blades 22 operative to cover the furrow formed by the plow 17 while the covering wheel 11 may be provided with a spring pressed scraper to keep its surface free of adhering lumps of earth. A covering blade 23 may also be supported from the frame members in the rear of the plow 13 for the purpose of covering or partially covering the furrow opened by it. The several parts to which reference has just been made are of well known form and construction and found in one or more combined fertilizing and seeding devices at present on the market so that further description thereof would be superfluous.

For operatively supporting a plurality, for example, two, of these seeders upon the sled, I provide the means now to be described and which comprise a vertically disposed frame having side members 30, 31 at the lower ends of which are respectively secured to the sled runners and cross member 32 bolted by bolts 33 to the upper ends of the side members which are respectively inwardly directed. Preferably I may provide a plurality of bolt holes 34 at each end of the cross member arranged at spaced intervals, thereby facilitating adjustment of the frame to sleds of varying width. For securely holding the frame in upright position I may provide braces 35, 36 respectively extending from a point about half way up each side member rearwardly and downwardly to the adjacent runner to which, as well as to the side member, each brace is rigidly bolted.

For imparting the requisite draft to the seeders as well as to provide a pivotal point about which they may be raised and lowered as hereinafter described, I provide a transversely extending preferably round pivot bar 40 adjacent the forward end of the sled; this bar may be supported near its ends in suitable U-shaped clips 41 in turn carried by brackets 42 firmly bolted to the adjacent transverse brace of the sled, these brackets being preferably of a sufficient length to position the bar at relatively considerable distance above the upper edge of the sled runners. Each of the seeders may be connected to this bar by a substantially U-shaped yoke having side members 43, 44 and a transversely disposed member or brace 45, the rear ends of the side members being drilled for the passage of the ground wheel axle 46 and their forward ends being projected beyond the cross member and bored for the passage of the pivot bar 40, the arrangement being such that the yoke will freely swing about the bar. For preventing the yokes from sliding longitudinally on the pivot bar adjustable clips 47 may be disposed on the latter.

It will thus be apparent that the frame members 9, 10 of each seeder as well as the parts supported therefrom are capable of vertical movement about the axle 46 with respect to the yoke by which the implement is connected to the pivot bar and that the yoke is capable of similar movement with respect to the latter but as it is desirable that the relative movement between the yoke and the seeder frame be limited I prefer to extend one of the yoke side members, for example, 43, rearwardly from the axle 46 and secure to the same an adjustable clip 48 having an ear or ears adapted to overhang the adjacent frame member so that when the latter is lifted relatively to the yoke until its upper edge engages the overhanging ear, further relative movement between the yoke and the frame will be prevented; consequently if the lifting movement of the frame be thereafter continued the yoke and frame members will turn as a unit about the pivot bar. In a similar way, assuming the seeder to be in raised position substantially as indicated in broken lines in Fig. 1 and the mechanism for raising and lowering the seeder as hereinafter described be operated so as to lower it to seeding position, the turning movement of both the yoke and seeder frame takes place initially about the pivot bar 40 until the ground wheel engages the surface of the hill after which any further downward movement of the seeder frame members and connected parts takes place about the axle 46 as the pivotal center. As the clip 48 is preferably made adjustable the extent of movement of the frame members about the axle 6 and relatively to the yoke may be varied as desired in conformity with the particular conditions of operation encountered.

For the purpose of raising and lowering all of the seeders simultaneously with respect to the sled so as to enable the former to be lifted entirely clear of the ground when desired and also for regulating the downward pressure exerted on the seeders whereby the furrow openers may be forced into the ground to a predetermined depth I provide an operating lever comprising a pair of laterally spaced upwardly and rearwardly directed arms 50 connected by a cross member 51; one of these arms may be made longer than the other so as to form an operating handle 52 disposed in a convenient position for manual actuation by the operator. This lever is pivoted on a horizontally disposed transversely extending pin 53 which passes through the lever arms closely adjacent the cross member 51 and through upwardly directed ears formed on a bracket 54 riveted to the cross member 32 of the frame. To one of these ears, conveniently that adjacent the lever arm which forms the operating handle, may be rigidly secured a notched quadrant 55 cooperative with latch mechanism generally designated as 56 carried by the operating lever and by means of which the lever may be locked to the quadrant in various positions of adjustment. Preferably the arms 50 and cross member 51 of the lever are formed as a unit from a single strip of metal and at a suitable distance above the pin 53 the arms are drilled for the passage of a horizontally disposed lifting rod 57 which extends loosely through clips 58, 58' respectively adjustably secured on spring rods 59, 59' in turn respectively arranged substantially in alignment with the several seeders. At its lower end each of these spring rods is provided with a downwardly depending yoke conveniently formed of oppositely disposed members 60, 61 whose lower ends are respectively pivotally connected to the side members 9, 10 of the adjacent seeder by bolts 62, the members of the yoke being sufficiently widely separated to permit the hopper 18 and other portions of the seeder to move between them when the latter is raised and lowered. On each of the spring rods below the clip 58 I dispose a coil spring 63 whose upper end bears against the clip and whose lower end seats on an adjustable collar 64 so that by securing the collar at different points on the rod the tension of the spring may be varied. As it is also desirable to provide for an adjustment of the clips 58 on the spring rods I may drill a plurality of spaced holes 65 in the latter in any of which a cotter pin 66 may be disposed to limit the upward movement of the clip 58; as the spring 63 tends to push the clip upwardly against the cotter pin it is generally unnecessary to place a corresponding pin below the clip.

For the purpose of keeping the seeders in parallel relation with each other at the proper distance apart I provide a spacing bar 70 having a plurality of holes drilled in each end and removably secure the same to the seeders so that the bar extends between them. Preferably this bar is positioned at a point remote from the pivot 40 and relatively near the rear ends of the seeders, a convenient place for its attachment being the base of the seed hoppers; by utilizing different holes for the passage of the bolts 71 by which the bar is secured in place the distance between the seeders may be readily varied. As it is desirable that the several seeders be capable of a limited amount of independent vertical motion to enable them to respectively follow any local undulations in the surface of the hill I prefer to attach the ends of the bar somewhat loosely to the seeders so that it can oscillate about the attaching bolts and thereby permit the seeders to rise and fall independently of each other while still operating to keep them in properly spaced alignment.

Figure 2:
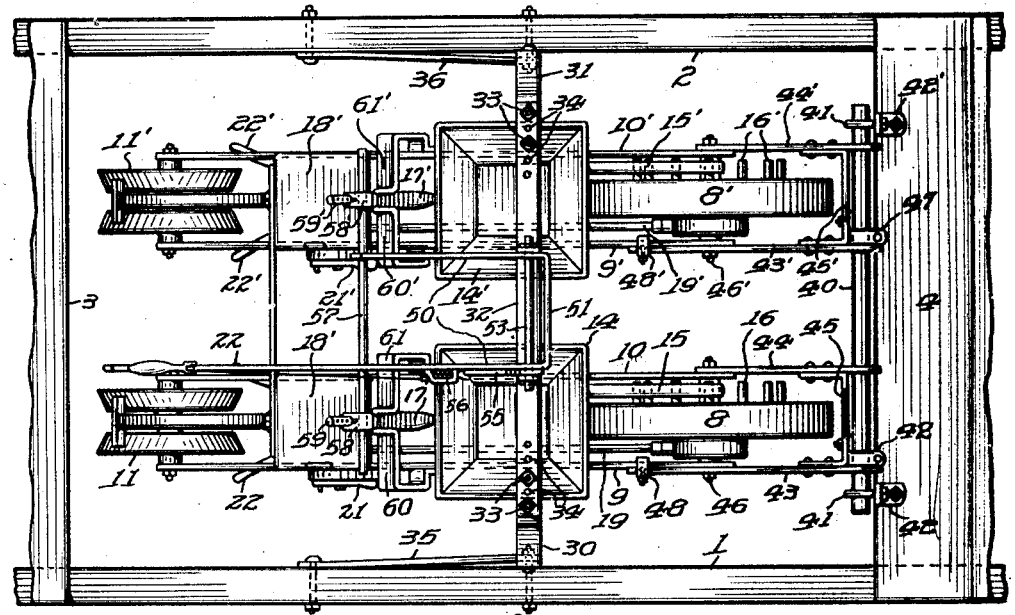

With the parts of the implement constructed and assembled substantially as hereinbefore described it will be apparent that when the lever 52 is raised sufficiently to engage the latch in one of the upper notches of the quadrant the seeders will be correspondingly simultaneously lifted to assume substantially the position indicated in broken lines in Fig. 1, thus raising the ground wheels and furrow openers of both seeders out of contact with the surface of the hill. When it is desired to begin the actual planting of the seeds the latch may be disengaged from the upper notches of the quadrant and the parts allowed to descend by their own weight until the ground and covering wheels of the seeders engage the surface of the hill; the latch may then be held out of engaging position by slipping a ring 72 carried by the handle 52 over the hand grip of the latch so that the lever will be capable of moving up and down slightly in conformity with any vertical movement of the seeders as the implement is pulled forward along the hill. Under these conditions the weight of the parts will ordinarily be sufficient to cause the furrow plows when properly adjusted on their supporting elements to open furrows of sufficient depth for the reception of the fertilizer and the smaller varieties of seed but when it is desired to force the plows more deeply into the ground or when the latter is of such character that more pressure on the plows is necessary than that ordinarily required to provide a relatively shallow furrow, the operating lever may be further depressed so as to engage its latch in one of the lower notches of the quadrant as shown in Fig. 1. This further movement of the lever forces the clips 58 downwardly on the spring rods, thus putting the springs 63 under compression (the amount of which is of course determined by the adjusted position of the collars 64). The springs therefore become effective through the collars to urge the yokes and in turn the frame members of the seeders downwardly with a yielding pressure, thereby forcing the furrow plows more strongly into the ground. It will be apparent that under these conditions should any of the furrow openers strike a stone or other obstruction the particular seeder to which it is attached can rise sufficiently to permit the opener to ride over the obstruction without disturbing the adjusted position of the other seeder or seeders and that when the end of the hill is reached or at any other time when desired all of the seeders may be raised simultaneously and supported out of operative position by moving the operating handle upwardly until its latch engages in one of the upper notches of the quadrant. Furthermore, by suitable manipulation of the operating lever the depth of the several furrows in which the seeds are to be planted can be simultaneously varied and adjusted to a nicety which is a matter of distinct advantage since under modern conditions of agriculture very definite rules have been evolved regarding the exact depth at which different varieties of seed must be planted to obtain the best results. By suitable adjustment of the clips 47 and the spacing bar 70 the distance between the seeders may be varied as desired, thus permitting the implement to be employed for planting seed in rows spaced at different intervals apart while when in operation the individual seeders can rise and fall independently to permit them to follow any little undulations or inequalities in the surface of the hill although maintained at all times in substantially parallel relation with consequent parallelism of the rows of seeds. By the use of an implement constructed in accordance with the present invention, the several rows of seed can be simultaneously planted in a most satisfactory manner, for the sled runners furnish a firm and steady support for the implement irrespective of slight inequalities in the contour of the valleys in which the runners are disposed, the latter being of such relatively great length as to bridge over any local depressions at the bottoms of the valleys; thus the implement as a whole moves forwardly in a substantially horizontal plane. On the other hand the several seeders can rise and fall independently and relatively to the runners in conformity with any slight local variations in the contour of the surface of the hill so that the seed plows form a continuous furrow of even depth in which all of the seeds are deposited at the same distance below the surface and thus, after sprouting, have the same amount of earth to penetrate to reach the surface with consequent regularity in the size of the plants making up the row.

While I have herein described one form of my invention in which but two seeders are employed, it will be understood that a greater or lesser number of seeders can be utilized if desired and further that I do not desire or intend to confine myself to any precise details in the design, construction and arrangement of the various elements or parts of the implement as minor changes and modifications may be made therein as desired without departing from the spirit and scope of the invention as defined by the appended claims.

Having thus described my invention, I claim and desire to protect by Letters Patent of the United States:

1. A seeding implement comprising a pair of laterally spaced parallel interconnected runners forming a sled adapted to straddle a hill, a plurality of seeders disposed between the runners in parallel relation, means connecting the forward end of each seeder to the sled and forming a horizontally disposed axis about which the seeders can independently turn, a frame secured to the runners and extending across the seeders, an operating lever carried by said frame and rotatable on a horizontal axis, a yoke pivotally connected adjacent the rear end of each seeder, and means connecting each of said yokes with said lever whereby movement of said lever is operative to raise and lower all of said seeders simultaneously with respect to the runners.

2. A seeding implement comprising a sled having laterally spaced runners adapted to straddle a hill, a plurality of seeders disposed between the runners, means connecting the forward ends of the seeders with the sled and forming a common axis about which all of said seeders are vertically movable, a frame secured to the runners and extending across the seeders, a U-shaped lever supported on the frame for movement about a horizontal axis, a yoke pivotally secured to each of the seeders adjacent its rear end, a rod extending from each yoke, means for connecting all of said rods to said lever whereby movement of the lever is operative to raise and lower all of the seeders simultaneously, and a coil spring mounted on each rod and co-operative with said connecting means whereby when said lever is depressed beyond a predetermined point said springs become operative to urge said seeders downwardly relatively to the runners.

3. A seeding implement comprising a sled having laterally spaced runners adapted to straddle a hill, a plurality of seeders disposed between the runners, means connecting the forward ends of the seeders with the sled and forming a common axis about which all of said seeders are vertically movable, a frame secured to the runners and extending across the seeders, a U-shaped lever supported on the frame for movement about a horizontal axis, a yoke pivotally secured to each of the seeders adjacent its rear end, a rod extending from each yoke, means for connecting all of said rods to said lever, and yielding means interposed between said connecting means and said yokes operative when said lever is depressed beyond a predetermined point to independently urge the seeders downwardly relative to said runners.

In witness whereof, I have hereunto set my hand this 1st day of November, 1926.

CHARLES J. ALLEN.